United States Patent
Moafa

(10) Patent No.: US 12,152,615 B2
(45) Date of Patent: Nov. 26, 2024

(54) PNEUMATICALLY-OPERATED EMERGENCY ISOLATION VALVE SWITCHOVER KIT

(71) Applicant: SAUDI ARABIAN OIL COMPANY, Dhahran (SA)

(72) Inventor: Abdullah Yahya Moafa, Damad (SA)

(73) Assignee: SAUDI ARABIAN OIL COMPANY, Dhahran (SA)

( * ) Notice: Subject to any disclaimer, the term of this patent is extended or adjusted under 35 U.S.C. 154(b) by 0 days.

(21) Appl. No.: 18/450,315

(22) Filed: Aug. 15, 2023

(65) Prior Publication Data
US 2023/0392712 A1 Dec. 7, 2023

Related U.S. Application Data

(62) Division of application No. 17/504,902, filed on Oct. 19, 2021.

(51) Int. Cl.
*F15B 20/00* (2006.01)
*F15B 13/04* (2006.01)
*F16K 37/00* (2006.01)

(52) U.S. Cl.
CPC ........ *F15B 20/008* (2013.01); *F16K 37/0025* (2013.01); *F16K 37/0075* (2013.01);
(Continued)

(58) Field of Classification Search
CPC ............ F16K 37/0075; F16K 37/0083; F16K 37/0091; F15B 2211/611; F15B 2211/855;
(Continued)

(56) References Cited

U.S. PATENT DOCUMENTS 7,828,008 B1 * 11/2010 Beckman ............ F16K 37/005
251/26
8,579,252 B2 * 11/2013 Heer .................... F15B 20/002
251/73

(Continued)

FOREIGN PATENT DOCUMENTS

GB 2346672 A * 8/2000 ......... F16K 37/0091
WO 2000052374 A1 9/2000

OTHER PUBLICATIONS

Office Action issued by Saudi Arabian Patent Office for corresponding Saudi Patent Application No. 124451116, mailed Sep. 27, 2024 (7 pages).

*Primary Examiner* — Atif H Chaudry
(74) *Attorney, Agent, or Firm* — Osha Bergman Watanabe & Burton LLP

(57) ABSTRACT

An emergency shutdown (ESD) system for a process control system includes an air supply coupled to a solenoid valve used to control a pneumatically-operated emergency isolation valve (ZV) via a switchover kit, a smart valve positioner coupled to the solenoid valve via the switchover kit, and an ESD controller. The ESD controller is configured to: control the supply of air from the air supply by the solenoid valve to open and close the ZV, and control the smart valve positioner so as to perform a partial stroke test on the ZV. The switchover kit includes a manifold having a plurality of valves coupling the air supply, the solenoid valve, and the smart valve positioner such that: based on a first setting of the plurality of valves, a first air flow path through the manifold connects the air supply directly to the solenoid valve, and based on a second setting of the plurality of valves, a second air flow path through the manifold connects the air supply to the solenoid valve through the smart valve positioner.

6 Claims, 4 Drawing Sheets

(52) U.S. Cl.
CPC ...... *F16K 37/0083* (2013.01); *F16K 37/0091* (2013.01); *F15B 2013/0409* (2013.01); *F15B 2211/855* (2013.01)

(58) Field of Classification Search
CPC .. F15B 2211/857; F15B 19/00; F15B 21/082; F15B 2211/8752; F15B 2211/8755; F15B 20/008; F15B 2013/0409
See application file for complete search history.

(56) References Cited

U.S. PATENT DOCUMENTS

| | | |
|---|---|---|
| 2010/0037966 A1 | 2/2010 | Braun et al. |
| 2012/0042721 A1* | 2/2012 | Al-Buaijan ......... F16K 37/0075 73/168 |
| 2012/0216898 A1 | 8/2012 | Carter et al. |
| 2017/0198829 A1* | 7/2017 | Alkandari ........... F16K 37/0083 |

* cited by examiner

PNEUMATICALLY-OPERATED EMERGENCY ISOLATION VALVE SWITCHOVER KIT

CLAIM FOR PRIORITY

This is a divisional application that claims priority to U.S. patent application Ser. No. 17/504,902 filed on Oct. 19, 2021, the entire contents of which are hereby incorporated by reference.

BACKGROUND

Pneumatically-operated emergency isolation valves (ZVs) are commonly installed in hydrocarbon processing facilities to provide safe isolation of flammable or potentially toxic material in the event of a fire or accidental release of fluids. The ZVs are operated locally though a local control panel or automatically operated through an emergency shutdown (ESD) system. The ZVs are normally in a fully opened or fully closed state. However, in order to assure that such ZVs can properly function, the ZVs are periodically tested by partially opening or closing the ZVs (i.e., using a partial stroke test). Because such tests are typically performed while the system is online and the process is running through the pipeline, it is important to perform any test quickly before returning the ZV to a normal operational state.

In conventional-type ESD systems, initially, only full stroke testing was able to be performed. Over time, in order to perform a partial stroke test in conventional-type ESD systems, a complex panel of pneumatic valves and switches were developed that needed to be manually used by an operator to partially open or close the ZV under test. This complicated action required an operator to fully understand and carefully operate all of the pneumatic valves and switches associated with the ZV in order to partially open or close the ZV being tested. Also, it is critical that any ESD system be capable of quickly switching into a safe condition when so commanded because it is possible that a failure event could occur during a ZV partial stroke test and the ZV under test would be required to quickly perform its safety function.

Accordingly, smart-type ZV systems have been developed in which an emergency shutdown (ESD) controller, using a smart valve positioner, automatically operates the pneumatic valves and switches associated with the ZVs in order to perform partial stroke test on particular ZVs. Further, the ESD controller also monitors the process control system and automatically switches the ZVs into a safe state in the event of a failure in the process control system. Even when not performing a partial stroke test, any of a number of failures in a smart valve positioner can errantly cause drive the ZVs into a safe state.

SUMMARY

This summary is provided to introduce a selection of concepts that are further described below in the detailed description. This summary is not intended to identify key or essential features of the claimed subject matter, nor is it intended to be used as an aid in limiting the scope of the claimed subject matter.

In one aspect, embodiments disclosed herein relate to an emergency shutdown (ESD) system for a process control system comprising: an air supply coupled to a solenoid valve used to control a pneumatically-operated emergency isolation valve (ZV) via a switchover kit, a smart valve positioner coupled to the solenoid valve via the switchover kit, an ESD controller configured to: control the supply of air from the air supply by the solenoid valve to open and close the ZV, and control the smart valve positioner so as to perform a partial stroke test on the ZV; wherein the switchover kit comprises: a manifold having a plurality of valves coupling the air supply, the solenoid valve, and the smart valve positioner such that: based on a first setting of the plurality of valves, a first air flow path through the manifold connects the air supply directly to the solenoid valve, and based on a second setting of the plurality of valves, a second air flow path through the manifold connects the air supply to the solenoid valve through the smart valve positioner.

In one aspect, embodiments disclosed herein relate to a method for operating and testing an emergency shutdown (ESD) system for a process control system comprising: an air supply coupled to, via a switchover kit, a solenoid valve used to control a pneumatically-operated emergency isolation valve (ZV), a smart valve positioner coupled to the solenoid valve via the switchover kit, an ESD controller configured to: control the supply of air from the air supply by the solenoid valve to open and close the ZV, and control the smart valve positioner so as to perform a partial stroke test on the ZV; wherein the switchover kit comprises: a manifold having a plurality of valves coupling the air supply, the solenoid valve, and the smart valve positioner, the method comprising: setting the plurality of valves in a first setting such that a first air flow path through the manifold connects the air supply directly to the solenoid valve, setting of the plurality of valves in a second setting such that a second air flow path through the manifold connects the air supply to the solenoid valve through the smart valve positioner, performing partial stroke tests on the ZV using the smart valve positioner only when the valves of the manifold are set in the second setting, and operating the emergency shutdown system with the valves of the manifold set in the first setting at times when partial stroke tests are not being performed.

Other aspects and advantages of the claimed subject matter will be apparent from the following description and the appended claims.

DETAILED DESCRIPTION

Figure 1:
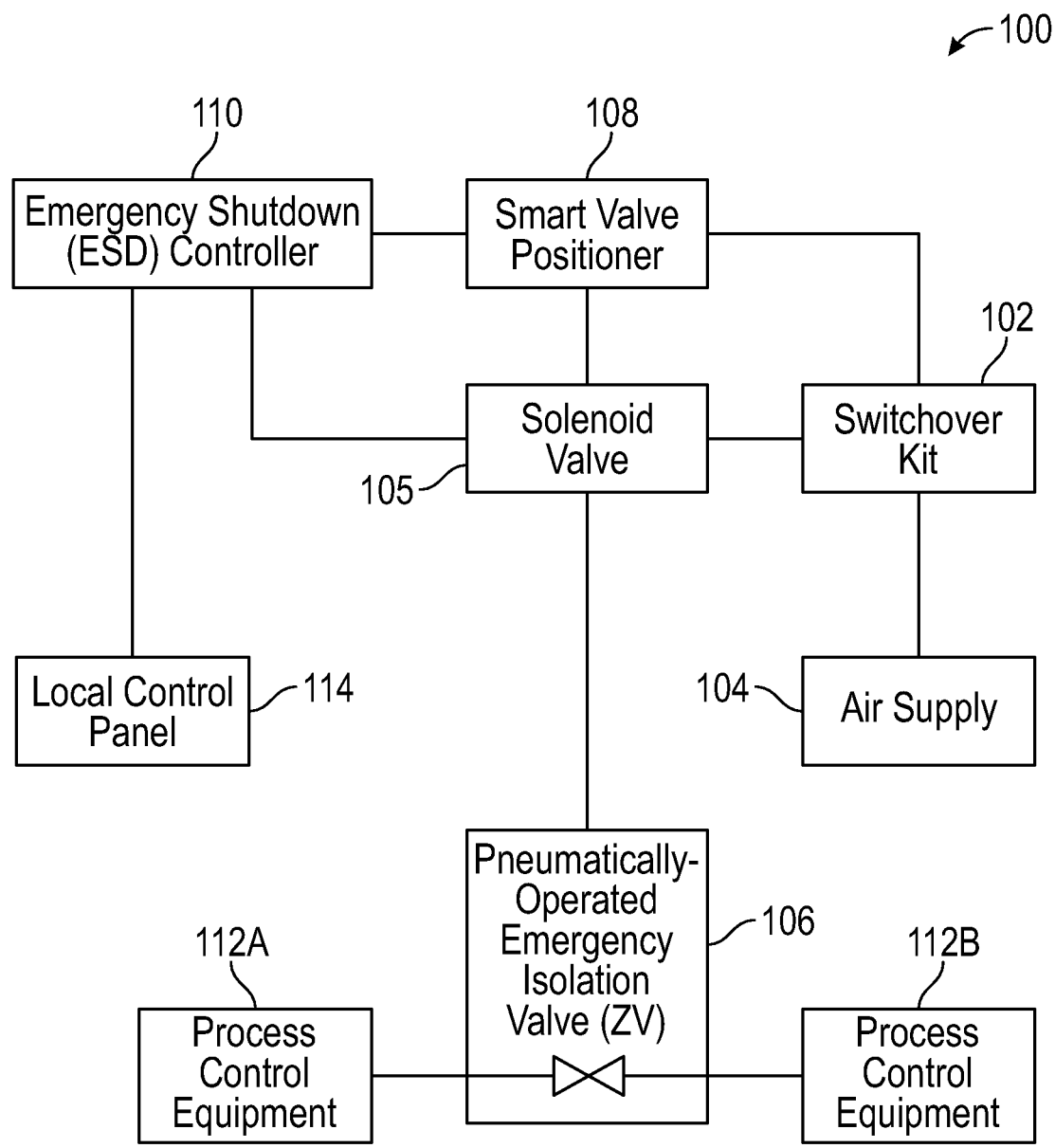
FIG. 1 is a diagram of an emergency isolation valve system in a hybrid-type setup.

In one aspect, embodiments disclosed herein relate to instrumentation/emergency shut-down valve control methods and apparatuses.

One or more embodiments relate to a pneumatically-operated emergency isolation valve (ZV) switchover kit. The use of such a switchover kit maintains the safety function of the ZV while preventing unintended ZV closure caused by smart valve positioner failure, which can lead to process upsets and unnecessary flaring. Also, the use of such a switchover kit provides a transfer mechanism to transfer a ZV from conventional-type to smart-type and vice versa. The switchover kit merges the advantages of conventional-type operations during normal operations with the advantages of smart-type operations during times when partial stroking is required. The transfer between conventional-type and smart-type operations can occur while the system is online and running. Thus, the transfer does not impact safety or cause any process interruption.

As those skilled in the art will appreciate, ZVs are required to be tested periodically to identify any potential failure(s) that could prevent them from performing their intended function during an emergency or process upset. Normally, ZV is fully stroked during plant shutdown. This shutdown requirement is not feasible at all times due to operation limitations. Therefore, one option is to perform partial stroke testing (e.g., stroke only 10% valve opening) to extend the full stroke test requirements up to nearest shutdown window. ZV partial stroke testing is a practice to ensure the functionality and reliability of the emergency isolation valves (ZV's). However, partial stroke testing can only be done by smart-type ZV setups.

Accordingly, there are generally two types of ZV setups available: a conventional-type ZV setup that merely controls opening/closing of the ZV with an emergency shutdown (ESD) controller (without a smart valve positioner) or a smart-type ZV setup that has an ESD controller for opening/closing the ZV and, additionally, is equipped with smart valve positioner to improve the valve testing capabilities by providing partial stroke testing capability. Conventional-type ZV setups require a full shutdown of operations in order to perform ZV testing. Smart-type ZV setups equipped with smart valve positioners allow automated, partial stroke testing of the ZVs so that operability can be tested while operations are still occurring.

There are typically massive numbers of both conventional-type and smart-type ZV setups installed through the process control system, e.g., at gas processing facilities. However, it is typical that most, if not all, critical paths within the process control system are installed with smart-type ZV setups equipped with smart valve positioners that, when necessary, are able to perform partial stroke tests without interrupting operations. However, while such an arrangement is generally desirable, smart valve positioners are prone to failure and, as the number of smart-type ZV setups are installed increases, the number of failure occurring in the smart valve positioners also increases. Failure of a smart valve positioner may result in the unintended closure of the ZV and can lead to process upsets and unnecessary flaring. Thus, it is in the interest of maintaining continuous, safe, and stable operations to minimize such unintended ZV closures.

Referring to FIG. 1, in accordance with one or more embodiments, a ZV system (100) is provided in a hybrid-type setup that includes a switchover kit (102), i.e., a mechanism to change from a conventional-type ZV setup to a smart-type ZV setup. In the hybrid-type setup of the ZV system (100), an air supply (104) is coupled to a pneumatically-operated emergency isolation valve (ZV) (106) via the switchover kit (102) and a solenoid valve (105). Further, a smart valve positioner (108) is coupled to the air supply (104) via the switchover kit (102), as well as coupled to the ZV (106) via a solenoid valve (105). When activated via the solenoid valve (105), the ZV (106) can be used to isolate process control equipment (112A) from process control equipment (112B) in the event of an emergency.

Also, an emergency shutdown (ESD) controller (110) is connected to the ZV system (100) and is configured to control the supply of air from the air supply (104) by the solenoid valve (105) to open and close the ZV (106).

Further, the ESD controller is connected to the smart valve positioner (108), which can be used to control the supply of air from the air supply (104) to the solenoid valve (105) so as to perform a partial stroke test on the ZV (106). The ESD controller may also be configured to control the switchover kit (102) to switch from a first air flow path that connects the air supply (104) directly to the solenoid valve (105) and a second air flow path that connects the air supply (104) to the solenoid valve (105) through the smart valve positioner (108). Alternatively, in one or more embodiments, the switchover kit (102) may be manually controllable, or controlled by a separate switchover kit controller, so that the switchover kit (102) can be used to convert an existing smart-type ZV setup into a hybrid-type ZV setup without changing any other equipment. A local control panel (114) is located in the field and connected to the ESD controller (110) in order to control the solenoid valve (105) from the field to open and close the ZV (106). In addition, the local control panel (114) may be used to send a command to the smart valve positioner (108) to perform partial stroke via the ESD controller (110). The local control panel (114) may be also used to control the process control equipment (112A, 112B).

Figure 2:
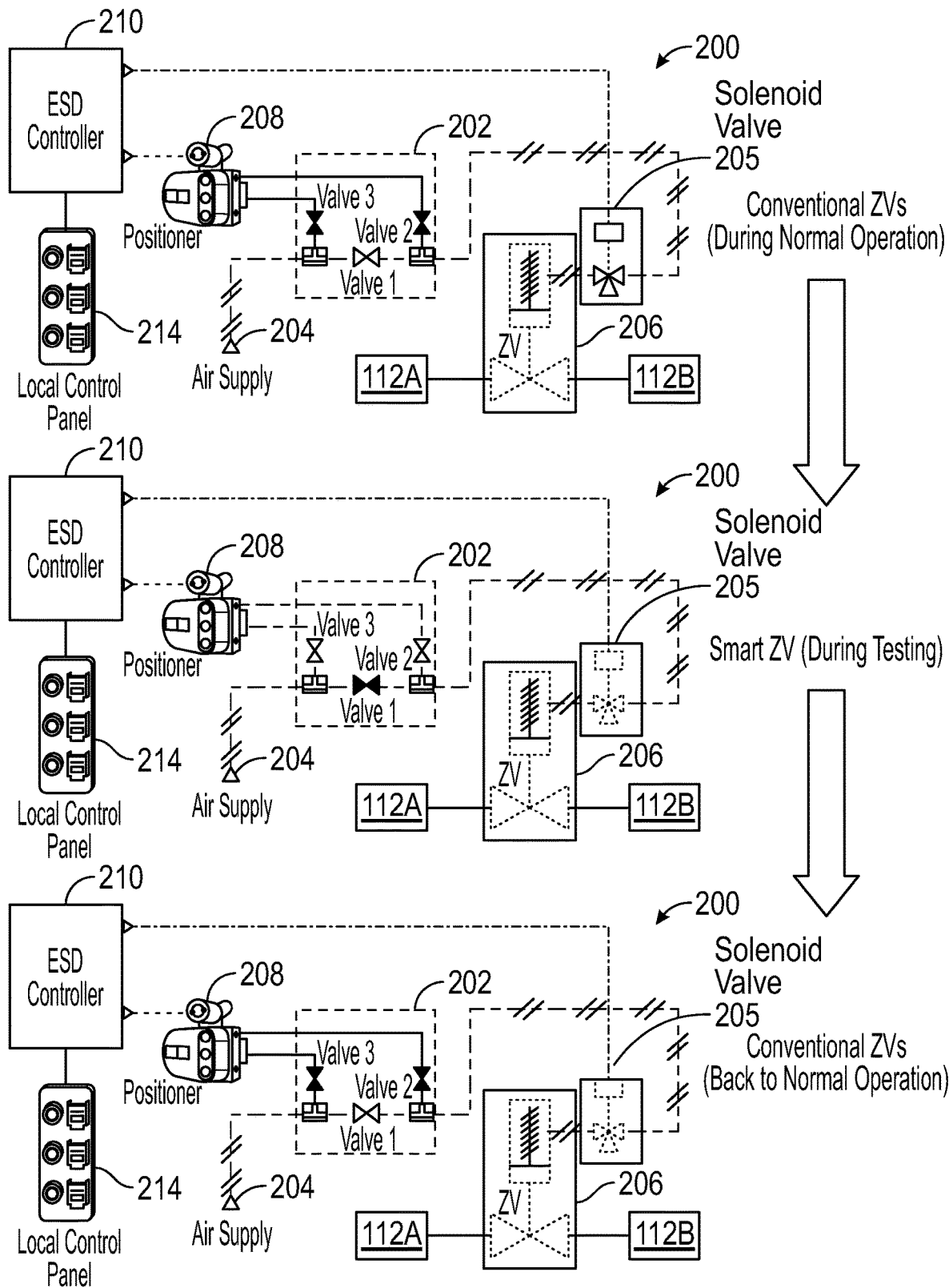
FIG. 2 is a diagram showing a switch from conventional-type to smart-type operations in an emergency isolation valve system in a hybrid-type setup.

Referring to FIG. 2, the operation of an embodiment of a ZV system (200) in a hybrid-type ZV setup is shown. Initially, during normal operations, the ZV system (200) is operated as a conventional-type ZV setup, bypassing the smart valve positioner (208). However, whenever partial stroke testing is required, the ZV system (200) is changed into a smart-type ZV setup using the switchover kit (202). The switching takes place while the system is online without impacting safety or causing process interruption. This helps overcome the issue of unintended closure of the ZV due to smart valve positioner failure, while maintaining the main safety function of the ZV. Once the partial stroke testing is complete, the switchover kit (202) returns to a conventional-type ZV setup bypassing the smart valve positioner (208).

In the embodiment shown, the ZV system (200) includes an air supply (204), solenoid valve (205), ZV (206), an ESD controller (210), process control equipment (212A, 212B), and local control panel (214) similar to the elements shown in the block diagram of FIG. 1. Accordingly, the coupling and operation of the similar elements is not repeated. As can be seen, in one or more embodiments, the switchover kit (202) may include a plurality of valves (valve 1, valve 2, valve 3) for selectively bypassing the smart valve positioner (208) depending on whether partial stroke testing is being performed or normal operations are proceeding.

Figure 3:
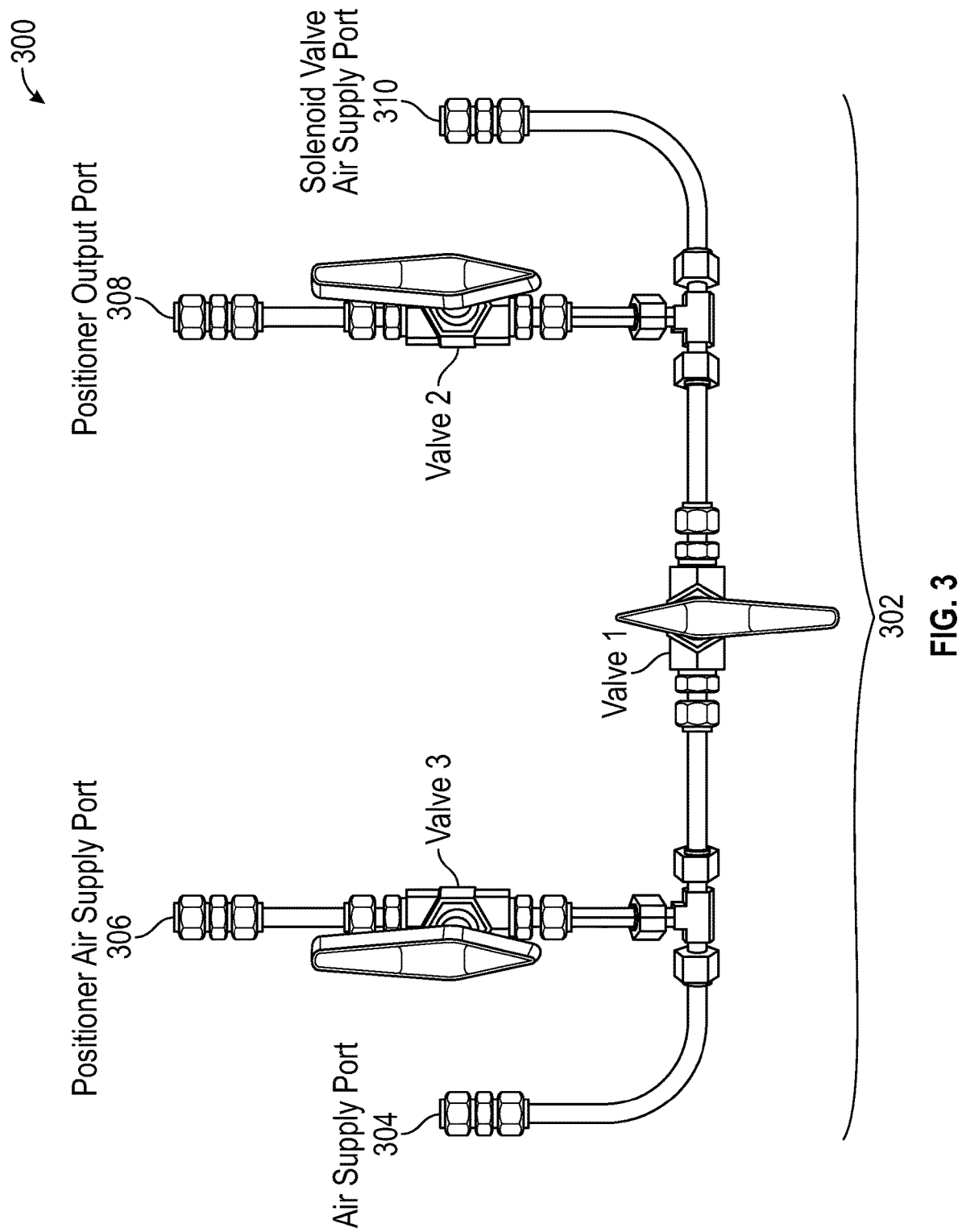
FIG. 3 is an embodiment of a switchover kit.

Referring to FIG. 3, in accordance with one or more embodiments, a ZV switchover kit (300) includes a manifold (302) having a plurality of valves (Valve 1, Valve 2, Valve 3) coupling an air supply (not shown), a solenoid valve (not shown), and a smart valve positioner (not shown). The several valves (Valve 1, Valve 2, Valve 3) as well as an air supply port (304), a smart valve positioner air supply port (306), a smart valve positioner output port (308), and a solenoid valve air supply port (310) may be configured to create, based on a first setting of the plurality of valves, a first air flow path through the manifold connects the air supply directly to the solenoid valve and, based on a second setting of the plurality of valves, a second air flow path through the manifold connects the air supply to the solenoid valve through the smart valve positioner.

As can be seen, in the embodiment shown, the valves (Valve 1, Valve 2, Valve 3) are manual valves, however, as previously stated, in one or more embodiments, automated valves may be employed that may be controlled by a single ESD controller for the entire ZV system or separate controllers respectively configured to specifically control either the solenoid valve or the switchover kit. Those skilled in the art will appreciate other types of valves may be employed without departing from the spirit of the disclosed embodiments of the invention.

Figure 4:
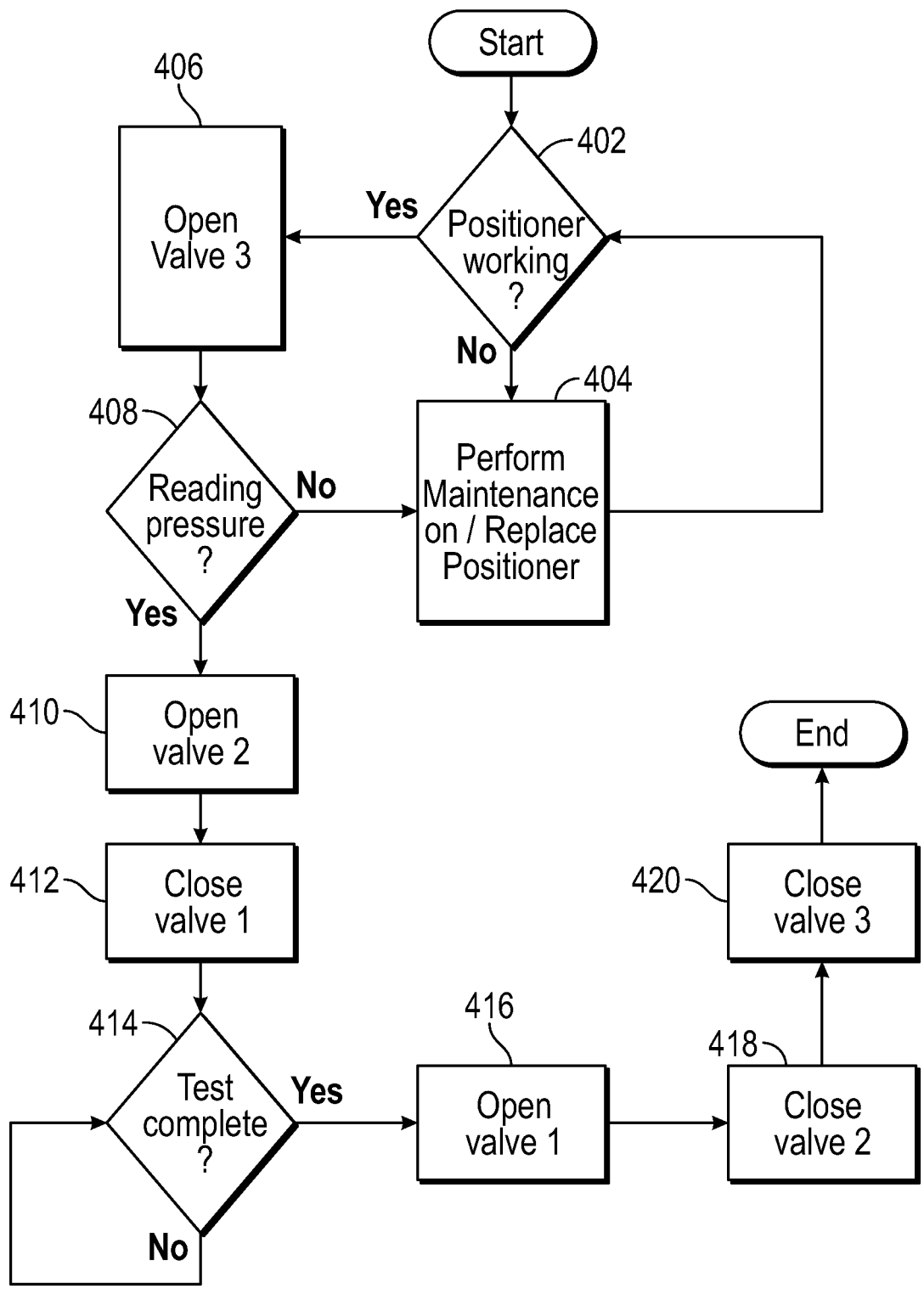
FIG. 4 is a flowchart showing operations of hybrid-type emergency isolation valve system.

Referring to FIG. 4, a method (400) of operating a ZV system in a hybrid-type setup as shown in FIGS. 2-3 may involve the following process steps.

In a first step (402), before switching from conventional-type operations to smart-type operations, it should be confirmed that the smart valve positioner is working by checking the smart valve positioner parameters utilizing the communicator. If the smart valve positioner is not operating properly for any reason, then maintenance should be performed on the smart valve smart valve positioner or the smart valve positioner should be replaced (404). Once it is confirmed that the smart valve positioner is functioning properly (402), the process can continue.

The steps to convert from conventional-type ZV to smart-type ZV for performing the partial stroke testing during PM include:

In step (406), Valve 3 is opened, which allows the flow of air from the instrumental air supply (IAS) port to flow to the smart valve positioner.

In step (408), check whether the smart valve positioner gauge reads the pressure in order to determine that the airflow is being properly received at the smart valve positioner. If the smart valve positioner is not receiving the airflow properly for any reason, then maintenance should be performed on the smart valve positioner or the smart valve positioner should be replaced (404). If the smart valve positioner is properly reading the pressure of the airflow, then the process can continue.

In step (410), Valve 2 is opened, which allows the smart valve positioner to supply air to the solenoid valve air supply port.

In step (412), Valve 1 is closed, which disconnects the direct connection between the IAS port and the solenoid air supply port, thereby only allowing air supply through the smart valve positioner.

The switchover kit remains in the smart-type ZV setup during partial stroke testing (414). Once the partial stroke testing has completed (414), the steps to return from the smart-type ZV to conventional-type ZV to continue normal operation include:

In step (416), Valve 1 is opened to re-connect the direct airflow path between the IAS port and the solenoid air supply port.

In step (418), Valve 2 is closed, which disconnects the smart valve positioner air supply port from the solenoid valve air supply port.

In step (420), Valve 3 is closed to disconnect the smart valve positioner entirely from the system. By doing so, maintenance or replacement of the smart valve positioner may occur while the system is still online and operating.

As those skilled in the art will appreciate, during normal operations, the valves of the switchover kit are configured so that the ZV system has a conventional-type ZV setup. However, by switching the valves of the switchover kit into a smart-type ZV setup, partial stroke testing of the ZV can occur. Thereafter, once the partial stroke testing has concluded, the system can be returned to a conventional-type ZV setup. Thus, the switchover kit allows, based on a first setting of the plurality of valves, a first air flow path that connects air from the air supply directly to the solenoid valve controlling the ZV and, based on a second setting of the plurality of valves, a second air flow path connects air from the air supply to the solenoid valve controlling the ZV through the smart valve positioner. As described above, in one or more embodiments, the switchover kit can be designed to work completely independently of the existing an ESD controller such that the switchover kit can be retrofit onto existing ZV systems without changing the function of any other equipment.

Embodiments of the present disclosure may provide at least one of the following advantages. One or more embodiments are low cost, easy and fast to build, and save production time by eliminating unwanted sudden closures. Further, one or more embodiments provide a transfer mechanism for switching between conventional-type operations and smart-type operations while the system is online. Also, one or more embodiments allow the performance of maintenance on or replacement of positioners or the internal parts of a positioner to occur while the system is online. Finally, one or more embodiments help prevent ZVs sudden closure due to failure of a positioner.

Although only a few example embodiments have been described in detail above, those skilled in the art will readily appreciate that many modifications are possible in the example embodiments without materially departing from this invention. Accordingly, all such modifications are intended to be included within the scope of this disclosure as defined in the following claims. In the claims, means-plus-function clauses are intended to cover the structures described herein as performing the recited function and not only structural equivalents, but also equivalent structures. Thus, although a nail and a screw may not be structural equivalents in that a nail employs a cylindrical surface to secure wooden parts together, whereas a screw employs a helical surface, in the environment of fastening wooden parts, a nail and a screw may be equivalent structures. It is the express intention of the applicant not to invoke 35 U.S.C. § 112(f) for any limitations of any of the claims herein, except for those in which the claim expressly uses the words 'means for' together with an associated function.

What is claimed is:

1. An emergency shutdown (ESD) system for a process control system comprising:
 an air supply coupled to a solenoid valve used to control a pneumatically-operated emergency isolation valve (ZV) via a switchover kit,
 a smart valve positioner coupled to the solenoid valve via the switchover kit,
 a single ESD controller separate from the switchover kit and configured to:
  control the supply of air from the air supply by the solenoid valve to open and close the pneumatically-operated emergency isolation valve (ZV), and
  control the smart valve positioner so as to perform a partial stroke test on the pneumatically-operated emergency isolation valve (ZV);
 wherein the switchover kit comprises:
  a manifold having a plurality of automated valves coupling the air supply, the solenoid valve, and the smart valve positioner such that:
  based on a first setting of the plurality of automated valves, a first air flow path through the manifold connects the air supply directly to the solenoid valve, and
  based on a second setting of the plurality of automated valves, a second air flow path through the manifold connects the air supply to the solenoid valve through the smart valve positioner, and wherein the single ESD controller is further configured to:
control the plurality of automated valves to establish the first air flow path connecting the air supply directly to the solenoid valve during normal operation of the process control system, wherein the smart valve positioner is isolated from the process control system during said normal operation, and
control the plurality of automated valves to establish the second air flow path connecting the air supply to the solenoid valve through the smart valve positioner during the partial stroke testing of the pneumatically-operated emergency isolation valve (ZV) without disrupting said normal operation.

2. The emergency shutdown system for a process control system according to claim 1, wherein the plurality of automated valves of the manifold of the switchover kit comprises:
a first valve for connecting/disconnecting airflow from the air supply to the solenoid valve;
a second valve for connecting/disconnecting airflow from the air supply to the smart valve positioner; and
a third valve for connecting/disconnecting airflow from the smart valve positioner to the solenoid valve.

3. The emergency shutdown system for a process control system according to claim 1, wherein the plurality of automated valves of the manifold of the switchover kit are automated valves controlled by the ESD controller.

4. A method for operating and testing an emergency shutdown (ESD) system for a process control system comprising:
an air supply coupled to a solenoid valve used to control a pneumatically-operated emergency isolation valve (ZV) via a switchover kit,
a smart valve positioner coupled to the solenoid valve via the switchover kit,
a single ESD controller separate from the switchover kit and configured to:
control the supply of air from the air supply by the solenoid valve to open and close the pneumatically-operated emergency isolation valve (ZV), and
control the smart valve positioner so as to perform a partial stroke test on the pneumatically-operated emergency isolation valve (ZV);
wherein the switchover kit comprises:
a manifold having a plurality of automated valves coupling the air supply, the solenoid valve, and the smart valve positioner, the method comprising:
setting, using the single ESD controller, the plurality of automated valves in a first setting such that a first air flow path through the manifold connects the air supply directly to the solenoid valve,
setting, using the single ESD controller, the plurality of automated valves in a second setting such that a second air flow path through the manifold connects the air supply to the solenoid valve through the smart valve positioner,
performing partial stroke tests on the pneumatically-operated emergency isolation valve (ZV) using the smart valve positioner only when the automated valves of the manifold are set by the single ESD controller in the second setting, and
operating the emergency shutdown system with the automated valves of the manifold set by the single ESD controller in the first setting at times when partial stroke tests are not being performed.

5. The method according to claim 4, wherein the plurality of automated valves of the manifold of the switchover kit comprises:
a first valve for connecting/disconnecting airflow from the air supply to the solenoid valve;
a second valve for connecting/disconnecting airflow from the air supply to the smart valve positioner; and
a third valve for connecting/disconnecting airflow from the smart valve positioner to the solenoid valve.

6. The method according to claim 4, wherein the plurality of automated valves of the manifold of the switchover kit are automated valves controlled by the ESD controller.

* * * * *